United States Patent
Rodder

[11] 3,735,752
[45] May 29, 1973

[54] SPIROMETER

[76] Inventor: Jerome A. Rodder, 774 Sunshine Drive, Los Altos, Calif. 94022

[22] Filed: Apr. 7, 1971

[21] Appl. No.: 131,920

Related U.S. Application Data

[63] Continuation-in-part of Ser. No. 809,847, March 24, 1969, abandoned.

[52] U.S. Cl.....................................128/2.08, 73/204
[51] Int. Cl. ...............................................A61b 5/08
[58] Field of Search....................128/2.08, 2.07, 2 R, 128/2 C, 2 F, 2.05 F; 73/204, 211, 213

[56] References Cited

UNITED STATES PATENTS

| 1,366,522 | 1/1921 | Crowell, Jr. ........................73/213 X |
| 1,559,155 | 10/1925 | Bullock ..............................73/213 X |
| 2,284,013 | 5/1942 | Pardoe ...................................73/213 |
| 2,872,810 | 2/1959 | Shaffer....................................73/213 |
| 3,081,766 | 3/1963 | Dubsky et al........................128/2.08 |
| 3,232,288 | 2/1966 | Krobath ..............................128/2.08 |
| 3,368,212 | 2/1968 | Kylce ..................................340/239 |
| 3,374,673 | 3/1968 | Trageser...............................73/204 |

FOREIGN PATENTS OR APPLICATIONS

| 1,105,567 | 7/1955 | France .................................128/2.08 |
| 1,109,118 | 4/1968 | Great Britain.........................73/204 |
| 6,603,610 | 9/1966 | Netherlands ..........................73/204 |

OTHER PUBLICATIONS

N.A.S.A. Tech. Brief, 68-10438, Dec. 1968.

*Primary Examiner*—Kyle L. Howell
*Attorney*—Christie, Parker & Hale

[57] ABSTRACT

A spirometer for measuring the flow rate of breath inhaled and exhaled through a disposable venturi tube includes a lateral conduit which communicates with the venturi tube. The flow of breath through the tube aspirates fresh air from the atmosphere through the conduit over a thermistor in the conduit which is connected to a bridge circuit to measure the flow rate of breath in the tube.

23 Claims, 7 Drawing Figures

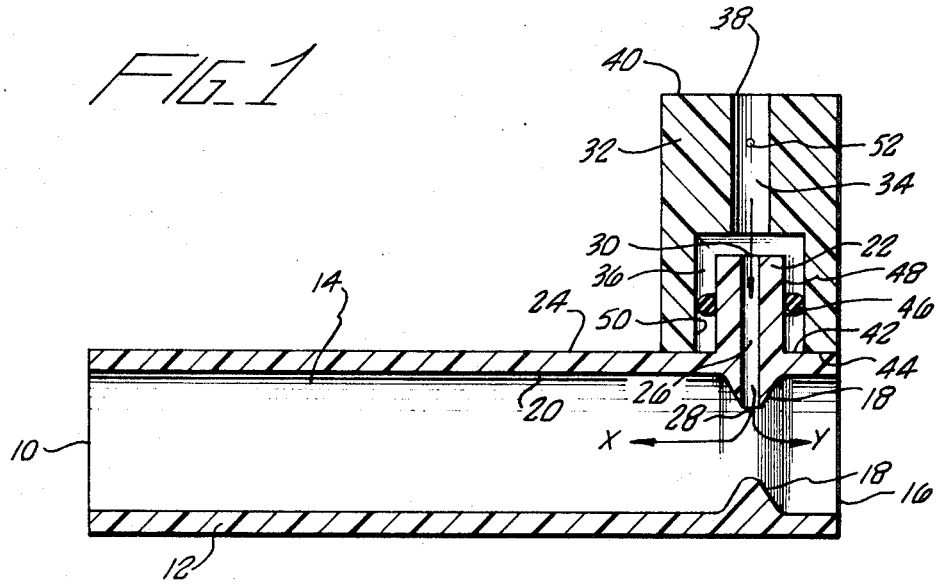

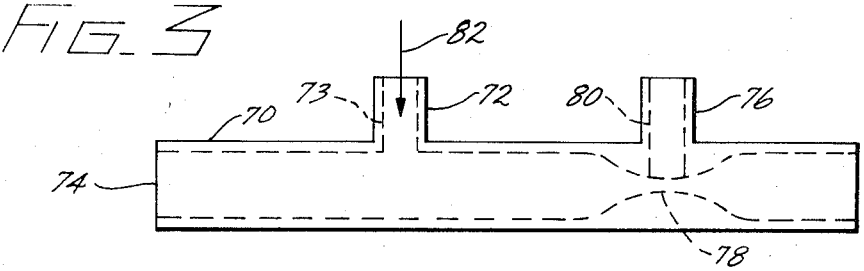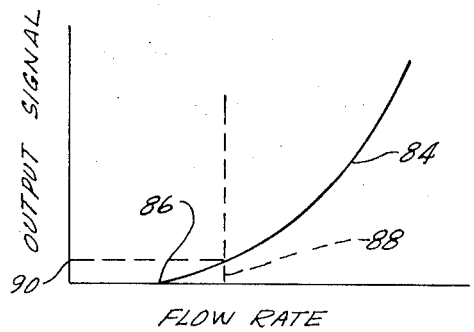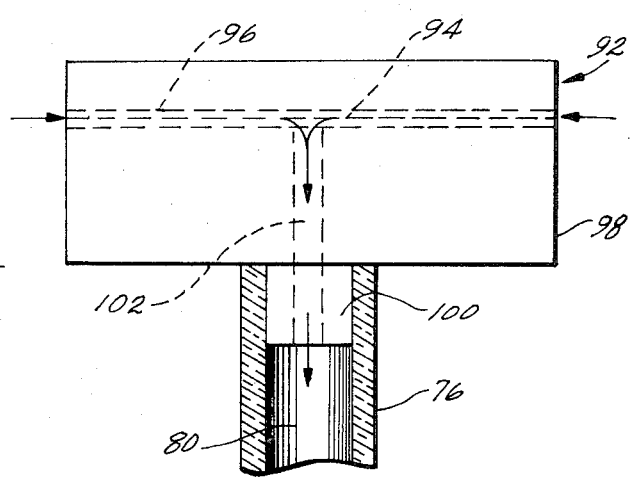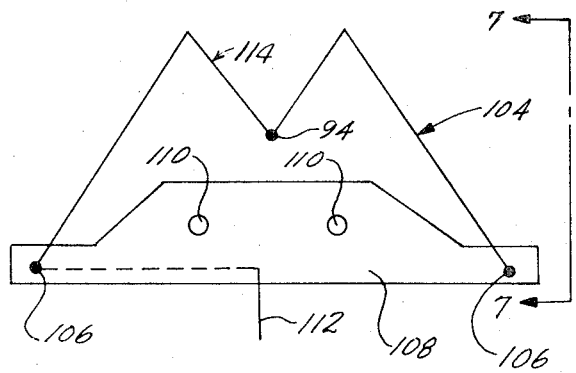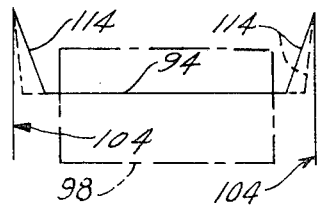

SPIROMETER

CROSS-REFERENCE TO RELATED APPLICATION

This is a continuation-in-part of my application Ser. No. 809,847, filed Mar. 24, 1969, now abandoned.

BACKGROUND OF THE INVENTION

This invention relates to apparatus for detecting pulmonary disorders, and more particularly to an improved spirometer for measuring the amount of air inhaled and exhaled by a patient for a period of time.

The conventional chest X-ray often does not detect restrictive lung diseases such as emphysema. The spirometer is particularly useful in detecting these disorders, because a reduced volume of air inhaled and exhaled by a patient is a reliable indication of restrictive lung disease. In spirometers presently available, the patient inhales and then exhales through a hose connected to a bellows or an inverted cylinder placed in a container of water. These devices have not been popular with doctors because of the contamination which occurs from each patient blowing through the same tube. Furthermore, the interior of the bellows becomes contaminated by the condensation of moisture from expired breath. Presently available spirometers are also too troublesome to operate on a large scale. For example, the bellows device is too bulky for use as a portable unit. The response time of the inverted cylinder is slow, and water splashes out of the container and must be changed frequently. The preferred spirometer of this invention rapidly measures flow rate of breath with a simple electrical circuit connected to a disposable flow pipe. The response time is fast, the device is portable, and the disposable pipe prevents contamination.

SUMMARY OF THE INVENTION

Briefly, the invention includes a disposable hollow flow pipe for transmitting breath inhaled and exhaled by a patient. A laterally disposed hollow channel opens into the flow pipe to communicate between the atmosphere and the interior of the pipe. Preferably, a tube is releasably sealed to the channel so that the flow pipe can be replaced after each test.

In the preferred form, electrical circuit means detect gas flow in the tube when breath is transmitted through the flow pipe. Means are preferably provided for inducing the flow of gas through the tube, the channel, and into the flow pipe in response to the transmission of breath. For example, a constriction may be placed in the flow pipe to create a venturi effect for withdrawing gas from the channel.

In the preferred form of the invention, a temperature-sensitive circuit element having an output responsive to gas flow, such as a thermistor, senses the flow of gas through the channel. Electrical means responsive to the output of the circuit element produce an output signal proportional to the rate of flow. The operation of most temperature-sensitive circuit elements is adversely affected by the condensation of moisture from expired breath. The present invention avoids this problem because the sensing element is not exposed to the patient's breath as he inhales and exhales.

BRIEF DESCRIPTION OF THE DRAWINGS

FIG. 1 is a sectional elevation showing the disposable venturi tube and the lateral conduit of this invention;

FIG. 2 is a schematic circuit diagram of the bridge circuit for measuring the rate of air flow in the lateral conduit;

FIG. 3 is an elevation showing an improved venturi tube;

FIG. 4 is a graph showing the relation between flow rate of air in a venturi type flowmeter and the output signal produced by the flowmeter;

FIG. 5 is an elevation showing means for decreasing the response time of the output signal of the breath flow measuring device;

FIG. 6 is a schematic elevation showing apparatus for supporting the hot wire in the breath flow measuring device; and FIG. 7 is a schematic elevation taken on line 7—7 of FIG. 6.

DETAILED DESCRIPTION OF THE PREFERRED EMBODIMENTS

Referring to the drawings, a patient (not shown) inhales and exhales through an opening 10 in one end of an elongated, hollow open-ended venturi tube 12. A central passage 14 extends the length of the tube and terminates in an opening 16 in the opposite end of the tube. The venturi tube is a disposable device, and is preferably constructed of plastic, glass, or other relatively inexpensive material.

An inwardly projecting constriction 18 encompasses the inner wall 20 of the venturi tube to provide a gradually reduced cross-sectional area within air passage 14. The constriction is preferably located downstream of opening 10 near opening 16. A hollow, cylindrical column 22 projects laterally outward from the outer surface 24 of the venturi tube adjacent the constriction. A narrow, central channel 26 extends the length of the column into the interior of the venturi tube, where it terminates in an opening, or venturi hole 28, in the apex of constriction 18. Channel 26 defines an exterior opening 30 in the outer end of column 22.

This invention additionally includes a hollow, open-ended, lateral conduit 32, having a centrally disposed stepped bore comprising a narrow, elongated air passage 34 which opens into an enlarged air passage 36. Air passage 34 defines an exterior opening 38 in an outwardly projecting end wall 40 of lateral conduit 32, and air passage 36 terminates in an enlarged opening 42 in the opposite end wall 44 of the conduit. The exterior column of the venturi tube is fitted through opening 42 into air passage 36, with the outer end wall 44 of the lateral conduit abutting against outer surface 24 of the venturi tube. An O-ring 46 is disposed about an exterior surface 48 of the column to provide an air-tight seal between the column and an inner wall 50 of air passage 36.

In the preferred form of this invention, a bead-type thermistor 52 is mounted in air passage 34, and measures the rate of air flow through the lateral conduit and channel 26 in a manner to be described. Preferably, the thermistor is embedded in the point of a glass bulb (not shown). There are various methods for mounting thermistor beads, but this method is preferred because it provides rapid response to variations in the rate of air flow through the tube.

In use, the outer column of the disposable venturi tube is inserted into the lateral conduit. Then the patient inhales and exhales through opening 10 in the venturi tube. The resulting flow of breath within passage 14 creates a partial vacuum at venturi hole 28, which causes room air to be aspirated through the lateral conduit and the channel into the interior of the venturi tube, as shown by the arrows in FIG. 1. Thus, as the patient inhales, room air passes the thermistor and travels through the venturi tube in direction X; when exhaling, air travels in direction Y. Constriction 18 is located downstream of opening 10 near opening 16, and creates a relatively gradual reduction in cross-sectional area to minimize the turbulence in air passage 14. The contamination problem of conventional spirometers is eliminated because the patient inhales and exhales through a disposable tube. Moreover, the thermistor is not contaminated by the patient's breath, because only fresh air is drawn past the thermistor when the patient exhales or inhales through the venturi tube. Thus, inhalation and exhalation can be measured in a sanitary fashion.

The rate of aspirated air flow in the lateral conduit is proportional to the flow rate of breath inhaled and exhaled through the venturi tube. This invention contemplates measuring the rate of air flow through the lateral conduit via thermistor 52 to avoid the contamination which would occur if the flow rate of breath were measured directly by mounting a thermistor in passage 14. For example, air flow carries away heat from the thermistor, and as the temperature of the thermistor decreases, its electrical resistance increases. Thus, the rate at which the resistance of the thermistor increases is a measure of the desired flow rate. Mounting thermistor 52 in passage 14 gives erroneous results because moisture collects on the thermistor during exhalation and acts as an electrical conductor, causing the resistance of the thermistor to decrease when cooled. The present invention avoids this problem because only room air passes the thermistor as the patient inhales and exhales.

Other transducers for measuring flow rate, such as the hot-wire anemometer can be used in the spirometer without departing from the scope of this invention. It is contemplated that these devices be used to measure the flow occurring in the lateral conduit to avoid the contamination and erroneous readouts resulting from direct contact with the flow of breath in passage 14.

The flow rate of air through the lateral conduit is measured by a four-element bridge circuit comprising thermistor 52, a compensating thermistor 54, a fixed resistor 56, and a variable resistor 58. A voltage source E is connected to terminals 60 and 64 of the bridge circuit to supply heating power to the thermistors to maintain their temperatures above ambient. Air flow in the lateral conduit changes the temperature, and therefore the resistance of thermistor 52, and the bridge circuit measures the resistance change to give a continuous measure of flow rate in the conduit. A recorder 68 is connected across terminals 62 and 66, and plots the bridge circuit output. The recorder is driven by a clock mechanism (not shown) so that flow rate is measured as a function of inhalation and exhalation time. The area under the curve is summed, if desired, to determine the volume of air inhaled and exhaled by the patient.

During steady-state conditions, no air flow is present in the conduit and the bridge is balanced. The bridge is preferably balanced by adjusting variable resistor 58 until the recorder shows no current flow between terminals 62 and 66. Thermistor 54 is mounted exteriorly of the tube to sense ambient temperature and correct for zero drift. That is, the thermistor is adapted to compensate for changes in ambient temperature by continuously maintaining a fixed steady-state resistance ratio between itself and thermistor 52 during changes in ambient temperature. When a patient inhales and exhales through the venturi tube, air flow in the lateral conduit increases the resistance of thermistor 52, which causes the bridge to become unbalanced. The bridge circuit compensates for the unbalance by feeding current to thermistor 54. Recorder 68 receives the unbalanced output current, which is a measure of the rate of air flow through the conduit. This flow is equivalent to the flow rate of breath in the venturi tube.

FIG. 3 shows an improved venturi tube 70 which is constructed the same as venturi tube 12, except that venturi tube 70 includes a second elongated, hollow, outwardly projecting, cylindrical column or bias conduit 72. A passage 73 through bias conduit 72 opens into the interior of venturi tube 70. Venturi tube 70 is open at both ends, and during use the patient blows through an opening 74 at one end of the tube. A hollow cylindrical column 76 projects laterally outward from the venturi tube for connection with a lateral conduit (not shown) such as conduit 32. An inwardly projecting constriction 78 is formed in the interior of the venturi tube adjacent to the end opposite opening 74. A passage 80 through column 76 opens into the interior of the venturi tube at the high point of constriction 78. A gas flow detecting device (such as thermistor 52 or a hot wire anemometer) senses the flow of air aspirated from the atmosphere, through the lateral conduit, into the venturi tube when the patient inhales or exhales through the tube.

During use of venturi tube 70, a stream of bias air, represented by arrow 82 in FIG. 3, passes at a constant rate of flow through passage 73 and into the interior of the venturi tube. The bias air provides a steady flow of air through the venturi tube which combines with the flow of breath produced by the patient to produce a sufficiently high rate of flow to be adequately detected by the gas flow detecting device.

The operation of the bias air supply is best understood by referring to FIG. 4, which shows a curve 84 representing a typical response of the output signal from a gas flow detecting device for a venturi type flowmeter as the flow rate of gas through the venturi tube changes. The curve shows that no output signal is produced even though the gas flow detecting device senses gas having a flow rate as high as that represented by the point 86 on curve 84.

The purpose of the bias air supply is to produce a constant flow rate of air through the venturi tube even though no air is being blown through the tube by the patient. For example, when the bias air supply has a flow rate represented by a point 88, i.e., greater than the flow rate at 86, an output signal 90 of some measurable magnitude is produced continuously even though no air flow is being produced by the patient. Thus, when the patient blows through the venturi tube, the gas flow detecting device always produces an output signal, the magnitude of the output signal always being greater than output signal 90. The magnitude of the bias air flow may be subtracted from the actual flow to give a measurement of the flow rate produced by the patient.

The bias air supply has the additional advantage of mixing with the patient's moist breath to reduce the relative humidity within the venturi tube so that no droplets form inside the tube. The bias air supply also provides for more equal input and output signals for the same rates of inhalation and exhalation than would be produced if no bias air supply were present.

FIG. 5 shows an alternate breath flow measuring device 92 in the form of a hot-wire anemometer. The response time of such devices generally slows down when room air is allowed to come in contact with the hot wire.

The flow measuring device 92 overcomes the slow response time problem. Gas flow is detected by an elongated horizontal hot wire 94 mounted along the axis of a narrow, elongated, horizontal passage 96 formed in an aluminum block 98. The hot wire is connected to conventional circuitry (not shown) for producing an output signal representing the flow rate of gas which comes in contact with the wire. The passage 96 is circular in cross-section and has a diameter of about 0.04 inch. The diameter of the hot wire is about 0.0005 inch. The block has an outwardly extending lateral conduit 100 which makes a sliding and sealing fit inside the passage through lateral column 76. Conduit 100 can also be adapted to make a sliding and sealing fit over lateral column 22 of venturi tube 12. An elongated cylindrical passage 102 extending along the centerline of lateral conduit 100 extends through the block 98 and opens into the intermediate portion of passage 96. (The means for sealing lateral conduit 100 to the lateral columns of the venturi tubes has been omitted for clarity.)

In use, the breath flow measuring device 92 is not orientation-sensitive, and the response time for the output signal produced by hot wire 94 is small. When the patient blows through the venturi tube, aspirated air travels from the atmosphere into each end of passage 96 and through passage 102, as shown by the arrows in FIG. 5. The small distance, i.e., about 0.02 inch, between the hot wire and the inner wall of passage 96 permits a steady-state output signal to be established rapidly. Tests conducted with the apparatus shown in FIG. 5 have produced response times of less than 35 milliseconds. The diameter of the hot wire and the passage in which it is mounted should be as small as practical. The smaller the passage, the higher the linear velocity of the air for a given volume of throughput. The smaller the wire, the greater the temperature change for a given velocity of air past it, and thus the larger the signal.

When hot wire 94 is heated it lengthens about 0.003 inch. FIGS. 6 and 7 schematically illustrates means for mounting the hot wire to prevent it from sagging relative to the axis of passage 96 when the wire is heated. The mounting device includes a separate upright M-shaped wire mounting spring 104 mounted adjacent to each end of block 98. The ends of each mounting spring 104 are soldered at 106 to respective circuit board 108 at a corresponding end of block 98. Each circuit board has holes 110 for mounting it to a suitable portion of the block. The apex of the V-shaped intermediate portion of each mounting spring 104 is aligned with the axis of passage 96 at a respective end of block 98, and each end of hot wire 94 is rigidly secured, such as by soldering, to the apex of the spring at its respective end of the block. A lead wire 112 connected to the end of each wire spring at 106 provides a path for electric current flowing through the hot wire.

In use, mounting springs 104 align hot wire 94 along the axis of passage 96. As illustrated best in FIG. 7, it is preferred to place hot wire 94 in tension before it is heated by having the V-shaped intermediate portions 114 of mounting springs 104 extend inwardly toward the opposite ends of mounting block 98. When wire 94 lengthens during heating, the V-shaped portions 114 of mounting springs 104 deflect to the position shown in phantom line in FIG. 7. Thus, the mounting springs continue to maintain hot wire 94 in tension and thereby prevent the wire from sagging relative to the longitudinal axis of passage 96.

I claim:

1. A spirometer comprising a disposable flow tube having an opening through it for transmitting human breath, a transverse lateral channel opening into the flow tube, a lateral conduit having an opening through it communicating with the channel, means in the flow tube for aspirating gas flow from the atmosphere through the lateral conduit and channel, and into the flow tube in response to the transmission of breath through the flow tube, means for detecting the aspirated gas flow in the conduit when breath is transmitted through the flow tube, and means connected to the gas flow detecting means for measuring the flow of breath.

2. Apparatus according to claim 1 wherein the lateral conduit is releasably sealed to the flow tube.

3. Apparatus according to claim 1 wherein the means for aspirating gas flow comprises a constriction disposed within the flow tube to create a partial vacuum for withdrawing gas from the lateral conduit into the flow tube.

4. Apparatus according to claim 1 wherein the gas flow detecting means comprises temperature-sensitive transducer means having an output responsive to gas flow, and wherein the measuring means includes means responsive to the transducer means output for producing an electrical output signal equivalent to the rate of gas flow through the lateral conduit.

5. Apparatus according to claim 4 wherein the measuring means includes means for recording the electrical output signal.

6. Apparatus according to claim 4 wherein the transducer comprises a circuit element adapted to develop variations in electrical conductivity in response to temperature changes induced by gas flow in the conduit.

7. Apparatus according to claim 4 wherein the means responsive to the transducer output comprises bridge means adapted to compensate for the variations in electrical conductivity developed by the transducer.

8. Apparatus according to claim 7 wherein the bridge means includes compensating means adapted to correct for changes in ambient temperature.

9. Apparatus according to claim 1 including a second transverse lateral channel opening into the flow tube for transmitting a steady flow of gas to the interior of the flow tube to bias the flow of breath through the flow tube.

10. Apparatus according to claim 1 in which the gas flow detecting means includes a body having an elongated narrow passage extending through it and opening to the atmosphere, the narrow passage being adapted for communication with the lateral conduit of the flow tube; and an elongated temperature-sensitive wire in the passage for detecting gas flow through the passage.

11. Apparatus according to claim 10 in which the narrow passage extends through the body and is open to the atmosphere at both ends, and in which the body includes a lateral channel transverse to the narrow passage and having one end opening into an intermediate portion of the narrow passage, the other end of the lateral channel opening into the lateral conduit.

12. Apparatus according to claim 10 in which the diameter of the narrow passage is about 0.04 inch, and the diameter of the temperature-sensitive wire is about 0.0005 inch.

13. Apparatus according to claim 10 including mounting means connected to each end of the wire for maintaining the wire continuously in tension in the narrow passage as the temperature of the wire changes.

14. Apparatus according to claim 13 in which the mounting means comprises a separate spring biased mounting member connected to each end of the wire, each mounting member being adapted to move so its point of connection to the wire moves along the axis of the wire as the wire expands and contracts in response to temperature changes.

15. For use in a spirometer having means for recording the flow of breath exhaled or inhaled by a patient, apparatus for producing and detecting gas flow which is proportional to the flow of breath produced by the patient, the apparatus comprising a disposable flow tube having an opening through it for transmitting human breath; a transverse lateral channel opening into the tube; a lateral conduit having an opening through it, with one end communicating with the channel and the other end open to the atmosphere; means in the flow tube for aspirating gas flow from the atmosphere through the conduit and the channel and into the flow tube in response to the transmission of breath through the flow tube; and sensing means for detecting the aspirated gas flow in the lateral conduit, whereby the flow of breath transmitted through the flow tube is measured when the recording means is connected with the sensing means.

16. Apparatus according to claim 15 wherein the lateral conduit is releasably sealed to the flow tube.

17. Apparatus according to claim 15 wherein the means for aspirating gas flow comprises a constriction disposed within the flow tube to create a partial vacuum for withdrawing gas from the lateral conduit through the channel into the flow tube.

18. Apparatus according to claim 15 including a second transverse lateral channel opening into the flow tube for transmitting a steady flow of gas to the interior of the flow tube to bias the flow of breath through the flow tube.

19. Apparatus according to claim 15 in which the lateral conduit includes a body having an elongated narrow passage extending through it and opening to the atmosphere, the passage being adapted for communication with the transverse lateral channel; and in which the sensing means includes an elongated temperature-sensitive wire in the narrow passage for detecting gas flow through the passage.

20. Apparatus according to claim 19 in which the narrow passage extending through the body is open to the atmosphere at both ends, and in which the body includes a lateral channel transverse to the narrow passage and having one end opening into an intermediate portion of the narrow passage, the other end of the lateral channel opening into the lateral channel of the flow tube.

21. Apparatus according to claim 19 in which the diameter of the narrow passage is about 0.04 inch, and the diameter of the temperature-sensitive wire is about 0.0005 inch.

22. Apparatus according to claim 19 including mounting means at each end of the wire for maintaining the wire in tension as the temperature of the wire changes.

23. Apparatus according to claim 22 in which the mounting means comprises a separate resilient mounting member connected to each end of the wire, each mounting member being adapted to move so its point of connection to the wire moves along the axis of the wire as the wire expands and contracts in response to temperature changes.

* * * * *